Aug. 19, 1924. 1,505,157
G. MARKEY
STOCK FEEDER
Filed July 2, 1921
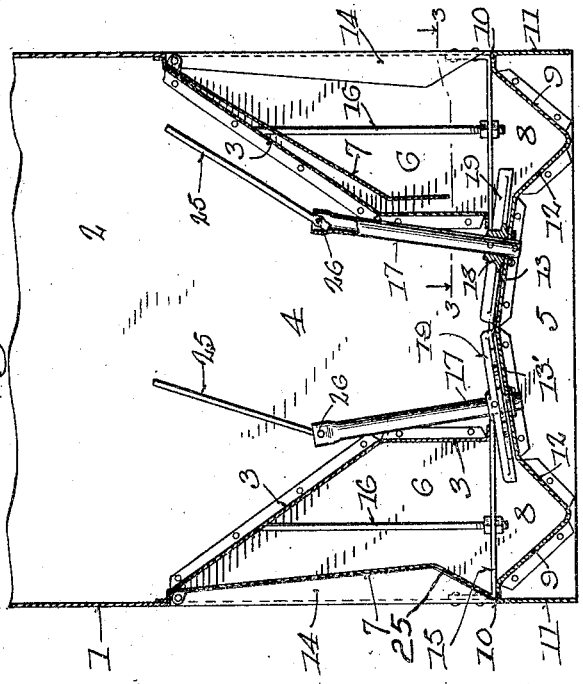
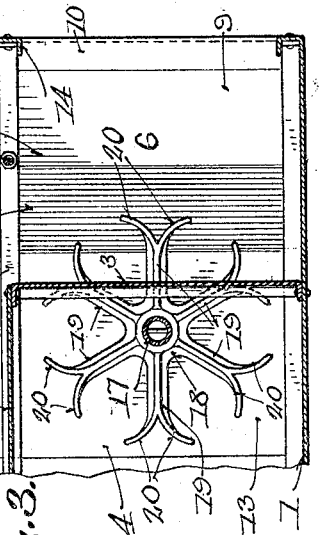
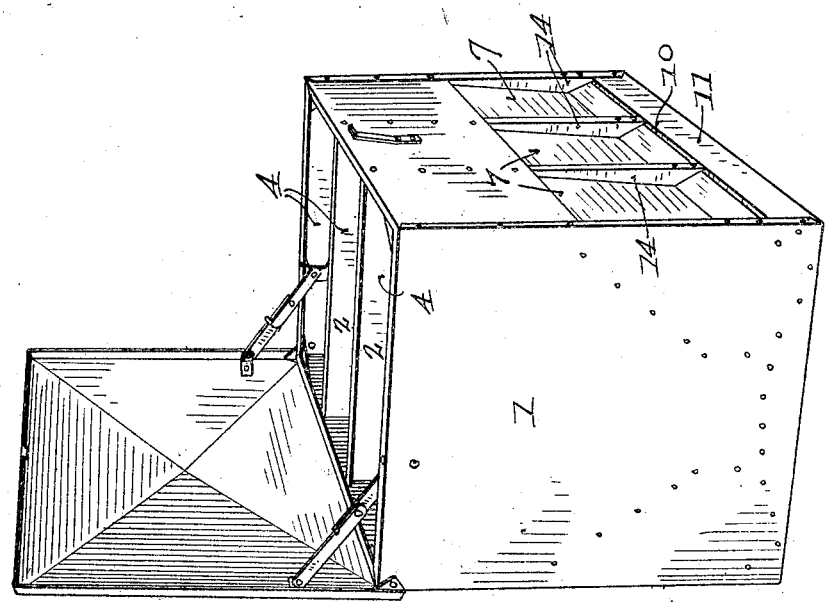
INVENTOR.
George Markey
BY
Erwin, Wheeler & Woolard,
ATTORNEYS.

Patented Aug. 19, 1924.

1,505,157

UNITED STATES PATENT OFFICE.

GEORGE MARKEY, OF FORT ATKINSON, WISCONSIN, ASSIGNOR TO JAMES MANUFACTURING COMPANY, OF FORT ATKINSON, WISCONSIN, A CORPORATION OF WISCONSIN.

STOCK FEEDER.

Application filed July 2, 1921. Serial No. 482,030.

*To all whom it may concern:*

Be it known that I, GEORGE MARKEY, a citizen of the United States, residing at Fort Atkinson, county of Jefferson, and State of Wisconsin, have invented new and useful Improvements in Stock Feeders, of which the following is a specification.

My invention relates to improvements in stock feeders with particular reference to that class of feeders in which ground feed or grain is stored within a substantially closed receptacle from which it is permitted to discharge slowly into a feed trough or bowl in response to effort on the part of the animal exerted upon a feed controlling device or member.

My invention is peculiarly adapted for use as a hog feeder.

The objects of my invention are to provide efficient means whereby the animal may cause a slow delivery of grain or ground feed from a storage chamber to the feed trough without being permitted to deliver such a quantity as to overflow the trough and thereby waste the material.

A further object of my invention is to provide efficient means for agitating the material within the storage chamber in such a manner as to prevent clogging, i. e., to eliminate the possibility of a failure of the material to drop toward the outlet after the material at the outlet has been withdrawn or delivered into the feeding bowl.

Further objects of my invention are to provide improved nose actuated feeding apparatus, and to provide for thorough sanitation by guarding the trough when not in use.

An embodiment of my invention is shown in the drawings in which:

Figure 1 is a perspective view of my improved stock feeder.

Figure 2 is a sectional view drawn generally to a vertical plane thru a pair of star wheels feeding in opposite directions.

Figure 3 is a horizontal sectional view drawn on line 3—3 of Figure 2.

Like parts are identified by the same reference characters thruout the several views.

An enclosing casing 1 is subdivided by partition walls 2 and 3 to form storage chambers 4, a base cavity 5, and feeding cavities 6. The outer wall of the casing is provided with an aperture leading to the chamber 6 and partially closed by a swinging lid 7, the lower portion of the cavity being closed by a feed bowl 8. The outer wall 9 of the bowl may be continuous with the upper margin 10 of the portion 11 of the casing, the wall 9 of the bowl 8 extending inwardly and then downwardly in an inclined plane to the reversely inclined rear wall 12, thus forming a V-shaped feed trough. The wall 12 of the bowl is connected, preferably integrally, with a floor member 13 of less inclination, which, taken with the oppositely inclined floor member 13′ forms the bottom of the bins or storage chambers 4.

Inwardly projecting wall members or flanges 14 partially separate the feeding cavities 6 on each side of the device, and cross bars 15 and vertical rods 16, provide the necessary strength and rigidity while allowing the cavity, including the feed trough, to be easily cleaned.

Feeding wheels are disposed on the floor members 13 and 13′ respectively, one wheel being used for each feeding cavity 6, and adapted to revolve about the axis of a shaft 17 journaled in the floor member. This feeding wheel preferably comprises a central web 18 and a series of prongs 19, having branches 20 which curve divergently from the respective ends of the prongs in the plane of the wheel. On the front side, the prongs 19 of each wheel project underneath the lower margin of the associated partition wall member 3, there being a slot or opening between the partition 3 and floor 13 or 13′ to allow the feeding wheel prongs to pass thru to the space above the rear portion of the feed trough. The number of prongs 19 and the extent to which they project into the cavity 6 above the feed trough is such that whenever the nose of the animal pushes a prong out of such exposed position, at least one other prong 19, or a branch 20 thereof, will be exposed sufficiently to allow it to be engaged by the animal's nose, whereby the animal in its effort to get at the feed will rotate or oscillate the wheel in a series of intermittent and short movements.

The wall 9 of the feed trough extends at its upper and outer margin to a higher level than the exposed prongs of the feeding wheel. Therefore the material not only feeds out slowly, but the total quantity is also limited by the capacity of the feed trough, for when the bowl is filled to the level of the feeding wheel, the latter carries material back into the associated chamber 4 to such an extent that it will not accumulate in the trough to a sufficient extent to overflow it, or allow it to be pushed out by the nose of the animal to a material extent. Each shaft 17 is preferably rigidly secured to its associated feeding wheel. Its lower end is journaled in the floor member and it extends upwardly for a substantial distance within its chamber 4. It is provided with a loosely jointed extension 25, preferably pivotally connected at 26 with the upper portion of the shaft 17, the shaft being preferably tubular, and flattened at its upper extremity to form an open slot which is crossed by the pivot pin 26. Therefore, when the feeding wheel is rotated, this extension piece 25 will swing outwardly and agitate or loosen the material and cause it to fall whenever a cavity is produced at the bottom by the feeding action of the wheel.

Each lid 7 preferably has a downwardly and outwardly inclined lower marginal portion 25 which facilitates closing the feeding cavity, and also facilitates the act of the animal in pushing this lid inwardly when feeding. It also conforms substantially to the vertical wall portion 26 and allows maximum feeding space.

I claim:—

1. The combination of a storage chamber for grain and ground feed, provided with an inclined floor, and a feeding recess, a rotatable feeding wheel on the bottom of said chamber provided with actuating means exteriorly exposed in said recess and an agitator located in the chamber and connected with the wheel, said agitator having an intermediately jointed member adapted to swing to an inclined position with reference to the lower portion.

2. In a stock feeder the combination with a storage chamber having an outlet in one side near its bottom, an inclined floor, and a rotary feeding member controlling the outlet and provided with a centrally disposed upwardly projecting agitator having a jointed extension member adapted for limited swinging movement.

3. In a stock feeder the combination with a feeding wheel, means for supporting the feeding wheel in an inclined plane, a centrally disposed, upwardly projecting agitator post having a socket at its upper end, and an extension member pivoted within the post socket and projecting upwardly therefrom, said extension member being adapted for limited swinging movement upon said pivotal connection.

4. In a hog feeder, a feeding wheel having radial prongs provided with divergently curving branches at their outer ends, in combination with a chamber partially enclosing said wheel and having an inclined floor, over which the wheel may operate.

5. In a stock feeder, the combination with a storage chamber having a slightly inclined bottom and a wall apertured adjacent said bottom, of a feeding trough exterior to the storage chamber and having a rear wall extending downwardly at angle obliquely to the bottom and a front wall extending upwardly above the aperture in the wall of the chamber, and a feeding wheel rotatably mounted within the storage chamber and disposed in a plane parallel to the plane of the bottom, said wheel having radial prongs adapted to project through said aperture and into the trough below the upper margin of the front wall thereof, each of the prongs being provided with divergently curving branches at its end, whereby to prevent an overflow of material from said trough.

GEORGE MARKEY.